United States Patent Office 3,020,362
Patented Feb. 6, 1962

3,020,362
MEANS FOR DELIVERING POWER SUPPLY TO TRAVELLING MACHINE ELEMENTS
Gilbert Waninger, Ettlingen, Baden, Germany, assignor to Kabelschlepp G.m.b.H., Siegen, Westphalia, Germany
Filed Sept. 6, 1957, Ser. No. 682,446
Claims priority, application Germany Sept. 6, 1956
1 Claim. (Cl. 191—12)

The present invention relates to means for delivering power supply to travelling machine elements and constitutes an improvement over my co-pending application, Serial No. 459,301, filed September 30, 1954, entitled Supply Conveying Means, now Patent No. 2,975,807.

The power supply to travelling machine elements, such as the rests of machine tools, crane trolleys, forge manipulators, et cetera, has always presented problems. In my earlier application, above identified, there is provided an arrangement in which a link chain is utilized, with the chain including perpendicularly disposed strut means having bores therein in which bores the power supply means are disposed or mounted and the links being so constructed as to allow only a limited angle of relative swing. In such an arrangement, the degree of the angle corresponds to the permissible radius of curvature of the most sensitive power supply means. In this fashion, a substantial and material diminution of the mechanical strain of the power supply means is attained and, furthermore, by the outerward protection of the assembly, wear is avoided. In addition, by restricting the radius of curvature, damage to the power supply means at the zones of bending is prevented. Another important factor is that the power supply means are free from longitudinal pull.

In Serial No. 459,301, the construction is such that the same is used in situations in which the power supply means are mounted in the link chain, with the chain movable in a vertical plane, i.e., the part to be moved, to which the power supply means are operatively associated, moves above or below the stationary connection of the power supply means. In actual practice, however, situations arise in which the part to be moved, must be, displaced horizontally or substantially horizontally alongside the stationary connection of the power supply means.

The essential object of the present invention is to provide means for guiding the power supply means wherein the same are operatively connected to a part to be moved horizontally or substantially horizontally alongside of the stationary connection of the power supply means as well as in situations as outlined in Serial No. 459,301 throughout longer distances.

More specifically, the invention employs the limited angle of swing and further provides that the chain, the links of which are positioned parallel to the plane of movement, is movable on two parallel tracks, with the chain being equipped with rollers in certain spaced relationship. The mean distance between the two tracks corresponds to the smallest curvature diameter of the chain.

If the chain flight operatively connected to the part to be moved is pulled, bevelled edges of the link members abut each other at the zone or region of bend so that bending of the chain within the permissible angle of swing is attained. On the other hand, if the same chain flight is displaced in the opposite direction, the edges lying on the side opposite to the bevelled edges of the links lying above the tracks cooperate while in the region of bend, the bevelled edges again cooperate. In this assembly, the width of the tracks must correspond only about to the distance of two adjacent rollers whereby when the chain is in the zone of its bend, the rollers are without support. Hence, skidding or friction of the rollers in the bend of the chain perpendicular to its turning plane is avoided so that the chain is easily movable.

Due to the fact that the rollers are without support in the region of the chain bend, the same must be self supporting perpendicularly to its movement plane throughout the double distance between two following roller axles.

To obtain a good guidance of the chain flight connected with the stationary connection of the power supply means, the track of this particular flight is provided with a longitudinally extending guide strip against which the outer rollers of the chain abut.

The entire assembly can be positioned in a U-shaped frame or housing and the tracks can be formed by raised portions of a base plate extending in the direction of movement of the chain, with the plate being a part of the housing.

Further objects and advantages of the invention will become more readily apparent from the following description and attached drawings.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein similar reference characters indicate the same or similar parts in the several views, and in which.

Figure 1:
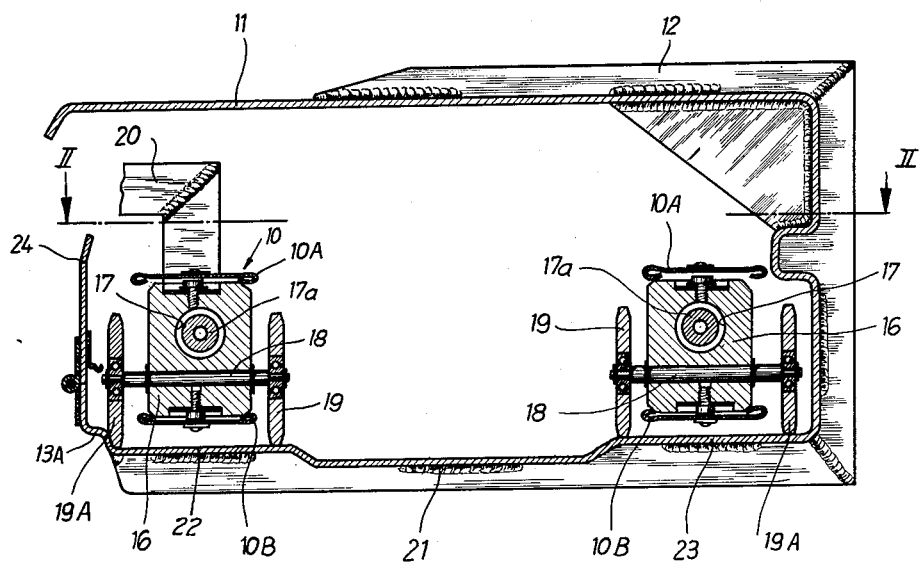
FIG. 1 is a vertical sectional view of an assembly embodying the invention.

Referring to FIG. 1, a chain 10 is movably mounted in a U-shaped housing 11 and the housing can be supported by framing elements 12 arranged at predetermined positions.

Figure 2:
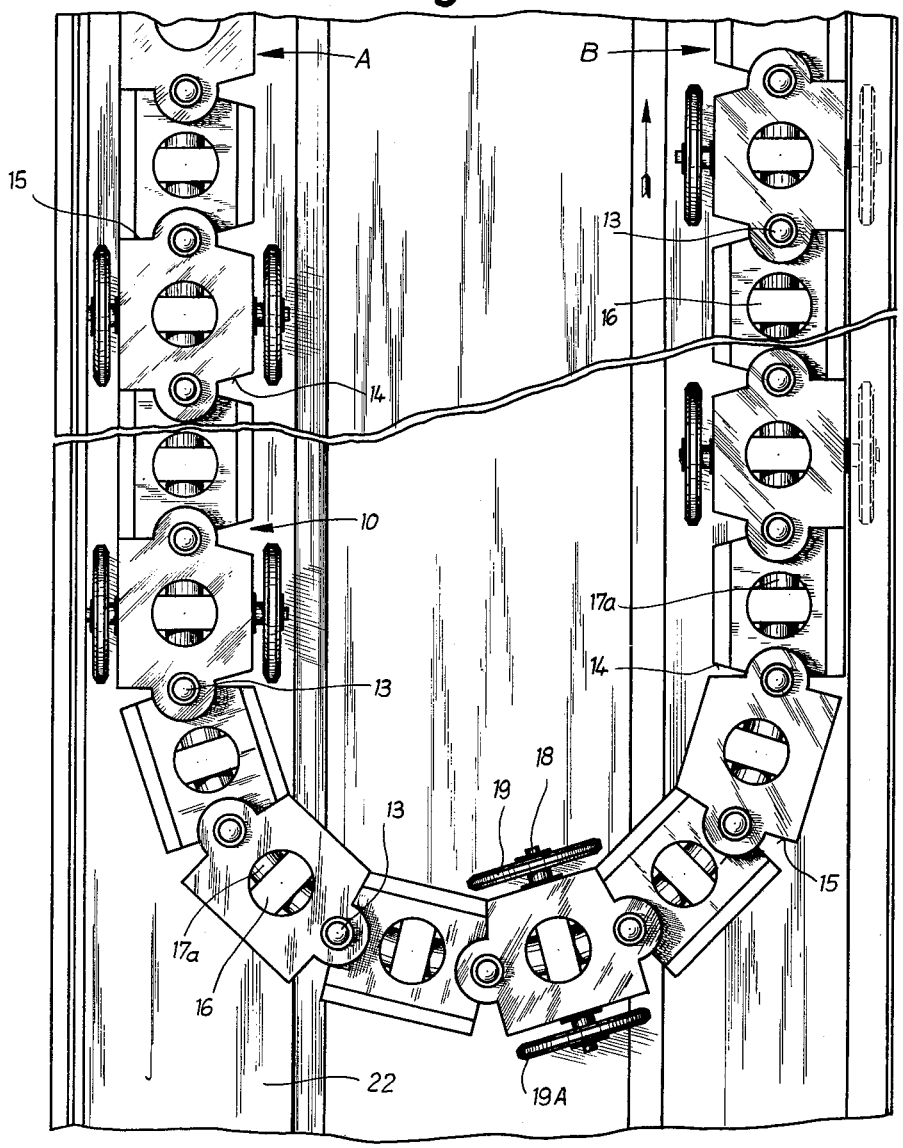
FIG. 2 is a top view taken along the line II—II of FIG. 1, the view looking in the direction of the arrows.
Figure 3:
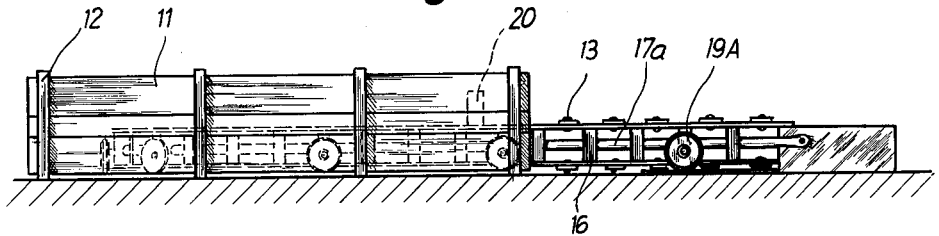
FIG. 3 is a side elevation on a smaller scale.

The chain 10 is defined by link members 10A and 10B, with the link members being directly connected together by means of pivot bolts or the like 13. As best shown in FIG. 2, one side of each of the link members is provided with a bevel edge 14 and the other side is formed with a straight or planar edge 15, the purpose of which will later be more fully described.

The corresponding link members 10A and 10B are connected by a web 16 which is provided with at least one through bore 17 adapted to receive a power supply means 17A of the type described in my co-pending application Serial No. 459,301. An axle 18 is journalled in the web 16 and rollers 19 and 19A are mounted on the ends of the axle.

It will be seen that chain flight A is connected with the stationary connection box or a take-off arm 20 whereas chain flight B is connected to the machine part to be moved. Base plate 21 of the housing 11 is provided with raised portions 22 and 23 constituting tracks for the flights of the chain and at the zone of bend of the chain, it will be observed that the chain is unsupported.

In order to permit access to the interior of the housing, a door 24 is provided in one of the sides of the housing and movement can be imparted to the chain by one or more motors located between the connection box and the machine part to be moved. When the chain is moved in the direction opposite to the arrow in FIG. 2 to avoid a yielding of the flight A or to prevent a skidding of the outer rollers 19A of this flight on the housing wall, the track 22 is equipped with a guiding edge or strip 13A.

If the chain flight B is pulled or moved in the direction of the arrow (FIG. 2), it will be noted that adjacent the bend of the chain, the bevel edges 14 of adjacent link members abut one another and thus determine the small permissible curvature diameter of the chain. If the chain flight B is moved in the direction opposite to the arrow, the straight edges 15 of adjacent link members additionally cooperate on the straight part of the chain flight B.

While the rollers of the chain flights A and B are supported on the tracks 22 and 23, the rollers in the bend zone of the chain are unsupported as the chain is self supporting throughout at least the double distance of two following roller axles. In either pulling or pushing the chain flight B, the rollers in the bend zone of the chain by being unsupported avoid a skidding or frictional engagement of these rollers perpendicularly to their turning plane.

While I have shown and described the preferred form of the invention, it is of course obvious that the invention is not to be thus limited.

Figure 4:
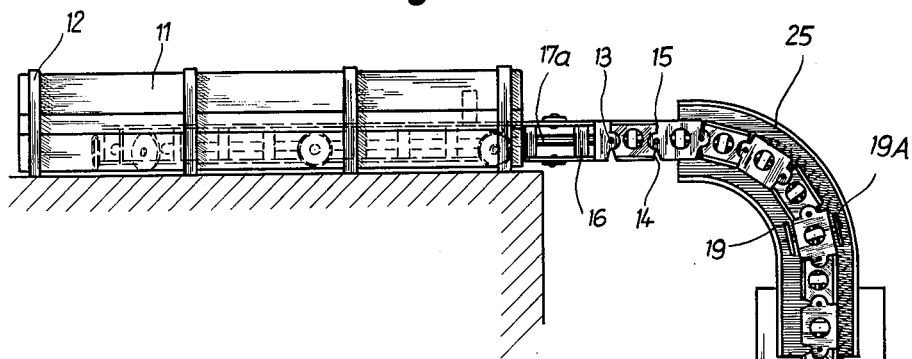
FIG. 4 is a side elevation of a combination with a track curved in a vertical plane.
Figure 5:
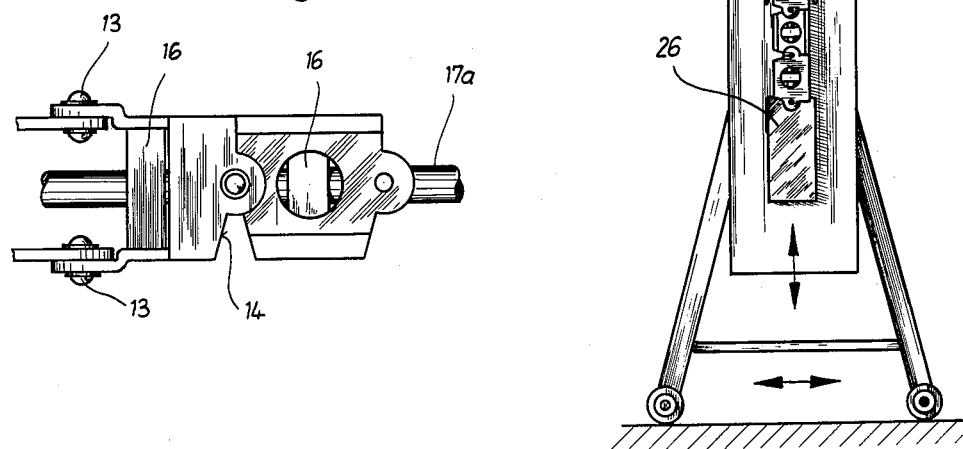
FIG. 5 is an enlarged elevational detail of a portion of the chain as shown in FIG. 4.

For example, the track 23 can be combined with a guide strip or track 25 curved in a vertical plane on which rollers 19 and 19A are guided so that the moving machine part 26 to be supplied can be raised or lowered and is capable of moving in a horizontal plane whereby the moving part has two degrees of freedom, as best shown in FIG. 4.

Instead of the specific roller arrangement illustrated, rollers can be mounted on the outer side of the chain, as well as rotatable balls for carrying the chain, with the tracks being formed to cooperate with such carrying members.

The invention is not to be confined to a strict conformity with the showings in the drawings but changes and modifications can be made therein provided such changes or modifications mark no material departure from the spirit and scope of the appended claim.

I claim:

An installation for delivering services such as electric power, compressed air, et cetera through a flexible conduit to a unit for movement along a track, comprising a plurality of links, each link being provided with a passage for receiving the conduit with such passages lying on one and the same axis, means directly pivotally connecting adjacent links to each other for relative movement about parallel axes that are at least perpendicular to the passages to form a flexible chain, two spaced apart tracks lying laterally opposed to each other, the distance between the tracks corresponding to the minimum curvature diameter of the chain, opposed spaced anti-friction means on at least some of the links of the chain movable on the tracks, the width of each track corresponding to the distance between the anti-friction means of the chain, the links including means whereby only a limited angularity in the plane of movement of the chain is possible so that a minimum radius of the chain and therefore of the conduit is not exceeded, said limiting means comprising bevel edges on one side of each link to one side of the pivotally connecting means determining the minimum radius and edges on each link on the other side of the pivotally connecting means extending perpendicularly to the passage, a base plate, and raised portions on said base plate defining said tracks with the tracks extending in the direction of the movement of the chain.

References Cited in the file of this patent

UNITED STATES PATENTS

| | | |
|---|---|---|
| 1,155,067 | Jones | Sept. 28, 1915 |
| 1,173,427 | Heyman | Feb. 29, 1916 |
| 1,266,996 | Schade | May 21, 1918 |
| 1,677,077 | Fortune | July 10, 1928 |
| 1,730,519 | McKee | Oct. 8, 1929 |
| 1,898,609 | Anderson | Feb. 21, 1933 |
| 2,417,141 | Syfert | Mar. 11, 1947 |
| 2,571,832 | Chapin | Oct. 16, 1951 |
| 2,727,088 | La Wall | Dec. 13, 1955 |
| 2,864,907 | Waninger | Dec. 16, 1958 |

FOREIGN PATENTS

| | | |
|---|---|---|
| 3,942 | Great Britain | Mar. 20, 1886 |
| 611,784 | Great Britain | Nov. 3, 1948 |
| 732,161 | Great Britain | Feb. 2, 1955 |